(12) United States Patent
Selim et al.

(10) Patent No.: US 12,254,275 B1
(45) Date of Patent: Mar. 18, 2025

(54) SYSTEMS AND METHODS FOR PROCESSING FORMS FOR AUTOMATED ADJUDICATION OF RELIGIOUS EXEMPTIONS

(71) Applicant: Optum, Inc., Minnetonka, MN (US)

(72) Inventors: Ahmed Selim, Dublin (IE); Rama Ravindranathan, Edison, NJ (US); Mostafa Bayomi, Dublin (IE)

(73) Assignee: Optum, Inc., Minnetonka, MN (US)

( * ) Notice: Subject to any disclaimer, the term of this patent is extended or adjusted under 35 U.S.C. 154(b) by 308 days.

(21) Appl. No.: 18/048,598

(22) Filed: Oct. 21, 2022

(51) Int. Cl.
  *G06F 40/30* (2020.01)
  *G06F 40/20* (2020.01)
  *G06N 3/08* (2023.01)

(52) U.S. Cl.
  CPC .............. *G06F 40/30* (2020.01); *G06F 40/20* (2020.01); *G06N 3/08* (2013.01)

(58) Field of Classification Search
  CPC .................................. G06F 40/30; G06F 40/20
  See application file for complete search history.

(56) References Cited

U.S. PATENT DOCUMENTS

| | | |
|---|---|---|
| 2005/0091038 A1 | 4/2005 | Yi et al. |
| 2015/0106157 A1 | 4/2015 | Chang et al. |
| 2018/0255101 A1 * | 9/2018 | Adam .................. G06F 21/6218 |
| 2020/0043582 A1 | 2/2020 | Riviere |
| 2020/0159820 A1 | 5/2020 | Rodriguez et al. |
| 2021/0326474 A1 * | 10/2021 | Sparks ................... G06Q 10/10 |

* cited by examiner

*Primary Examiner* — Ibrahim Siddo

(74) *Attorney, Agent, or Firm* — Bookoff McAndrews, PLLC

(57) ABSTRACT

Systems and methods are disclosed for processing forms to automatically adjudicate religious exemptions. The method includes receiving an input from a user to data fields of forms associated with a religious exemption request, wherein the input is in a first data format and includes location information, religious information, employment information, or demographic information associated with the user. Exemption-relevant features are determined from the input. A data object including the exemption-relevant features is generated. The exemption-relevant features are transformed into corresponding embeddings in a second data format, wherein the embeddings represent semantic relations between the exemption-relevant features. The authenticity of the data object is determined based on the embeddings using a classification model that has been trained using a plurality of embeddings representative of a plurality of exemption-relevant features. A notification is transmitted indicating an approval or a disapproval of the religious exemption request.

20 Claims, 7 Drawing Sheets

| SPECIAL STATE 403 | CERTIFIED FROM STATE 405 | SITE THEY WORK AT 407 | JOB CODE 409 | LOCATION CODE 411 | NLP SCORE 413 | DECISION THRESHOLD 415 |
|---|---|---|---|---|---|---|
| TX | LA | CLINIC | RN | TX078 | 65 | 60-82 |
| TN | FL | MEMBER'S HOME | MD | TN098 | 34 | 67-85 |
| FL | LA | SHARES AIR SPACE W/PATIENTS | ANA23 | FL015 | 47 | 40-65 |
| N/A | TN | CLINIC | AZB120 | TN761 | 38 | 40-65 |

FIG. 4A

SYSTEMS AND METHODS FOR PROCESSING FORMS FOR AUTOMATED ADJUDICATION OF RELIGIOUS EXEMPTIONS

TECHNICAL FIELD

The present disclosure relates generally to natural language processing and text analytics, and more particularly, to systems and methods for analyzing texts of forms to adjudicate religious exemptions.

BACKGROUND

Medical or non-medical exemptions, e.g., exemptions based on religious grounds, are allowed for vaccination requirements. A record number of people are seeking such exemptions, but to protect the people and contain the exposure risks, such requests need to be adjudicated with care, and without bias. However, with the influx of exemption requests, their adjudication is becoming challenging. Currently, healthcare employees are manually reviewing the forms to approve or deny exemption requests, this process is time-consuming, error-prone, and may involve unintentional bias that negatively influences the adjudication of exemption requests.

The techniques of this disclosure may solve one or more of the problems set forth above and/or other problems in the art by utilizing natural language processing (NLP) and text analytics to analyze texts of various forms to automatically adjudicate religious exemptions. The scope of the current disclosure, however, is defined by the attached claims, and not by the ability to solve any specific problem. The background description provided herein is for the purpose of generally presenting the context of the disclosure. Unless otherwise indicated herein, the materials described in this section are not prior art to the claims in this application and are not admitted to be prior art, or suggestions of the prior art, by inclusion in this section.

SUMMARY

In one embodiment, a computer-implemented method for processing one or more forms to automatically adjudicate religious exemptions for one or more users include: receiving, at a processor via a user interface of a user device, an input from a user to one or more data fields of the one or more forms associated with a religious exemption request, wherein the input is in a first data format and includes one or more of: location information, religious information, employment information, or demographic information associated with the user; determining, by the processor, one or more exemption-relevant features from the input; generating, by the processor, a data object including the one or more exemption-relevant features; transforming, by the processor and using a language model, the one or more exemption-relevant features into corresponding one or more embeddings in a second data format, wherein the one or more embeddings represent semantic relations between the one or more exemption-relevant features; determining, by the processor and using a classification model, authenticity of the data object based on the one or more embeddings, wherein the classification model has been trained using a plurality of embeddings representative of a plurality of exemption-relevant features; and transmitting, by the processor, a notification to the user, the notification indicating an approval or a disapproval of the religious exemption request.

In accordance with another embodiment, a system for processing one or more forms to automatically adjudicate religious exemptions for one or more users, includes one or more processors; and at least one non-transitory computer readable medium storing instructions which, when executed by the one or more processors, cause the one or more processors to perform operations including: receiving, via a user interface of a user device, an input from a user to one or more data fields of the one or more forms associated with a religious exemption request, wherein the input is in a first data format and includes one or more of: location information, religious information, employment information, or demographic information associated with the user; determining one or more exemption-relevant features from the input; generating a data object including the one or more exemption-relevant features; transforming, using a language model, the one or more exemption-relevant features into corresponding one or more embeddings in a second data format, wherein the one or more embeddings represent semantic relations between the one or more exemption-relevant features; determining, using a classification model, authenticity of the data object based on the one or more embeddings, wherein the classification model has been trained using a plurality of embeddings representative of a plurality of exemption-relevant features; and transmitting a notification to the user, the notification indicating an approval or a disapproval of the religious exemption request.

In accordance with a further embodiment, a non-transitory computer readable medium for processing one or more forms to automatically adjudicate religious exemptions for one or more users, the non-transitory computer readable medium storing instructions which, when executed by one or more processors, cause the one or more processors to perform operations including: receiving, via a user interface of a user device, an input from a user to one or more data fields of the one or more forms associated with a religious exemption request, wherein the input is in a first data format and includes one or more of: location information, religious information, employment information, or demographic information associated with the user; determining one or more exemption-relevant features from the input; generating a data object including the one or more exemption-relevant features; transforming, using a language model, the one or more exemption-relevant features into corresponding one or more embeddings in a second data format, wherein the one or more embeddings represent semantic relations between the one or more exemption-relevant features; determining, using a classification model, authenticity of the data object based on the one or more embeddings, wherein the classification model has been trained using a plurality of embeddings representative of a plurality of exemption-relevant features; and transmitting a notification to the user, the notification indicating an approval or a disapproval of the religious exemption request.

It is to be understood that both the foregoing general description and the following detailed description are exemplary and explanatory only and are not restrictive of the detailed embodiments, as claimed.

BRIEF DESCRIPTION OF THE DRAWINGS

The accompanying drawings, which are incorporated in and constitute a part of this specification, illustrate various exemplary embodiments and together with the description, serve to explain the principles of the disclosed embodiments.

FIG. 4A is a diagram that represents a table with a plurality of exemption requests and NLP scores assigned to the exemption requests, according to one example embodiment.

DETAILED DESCRIPTION

Figure 1:
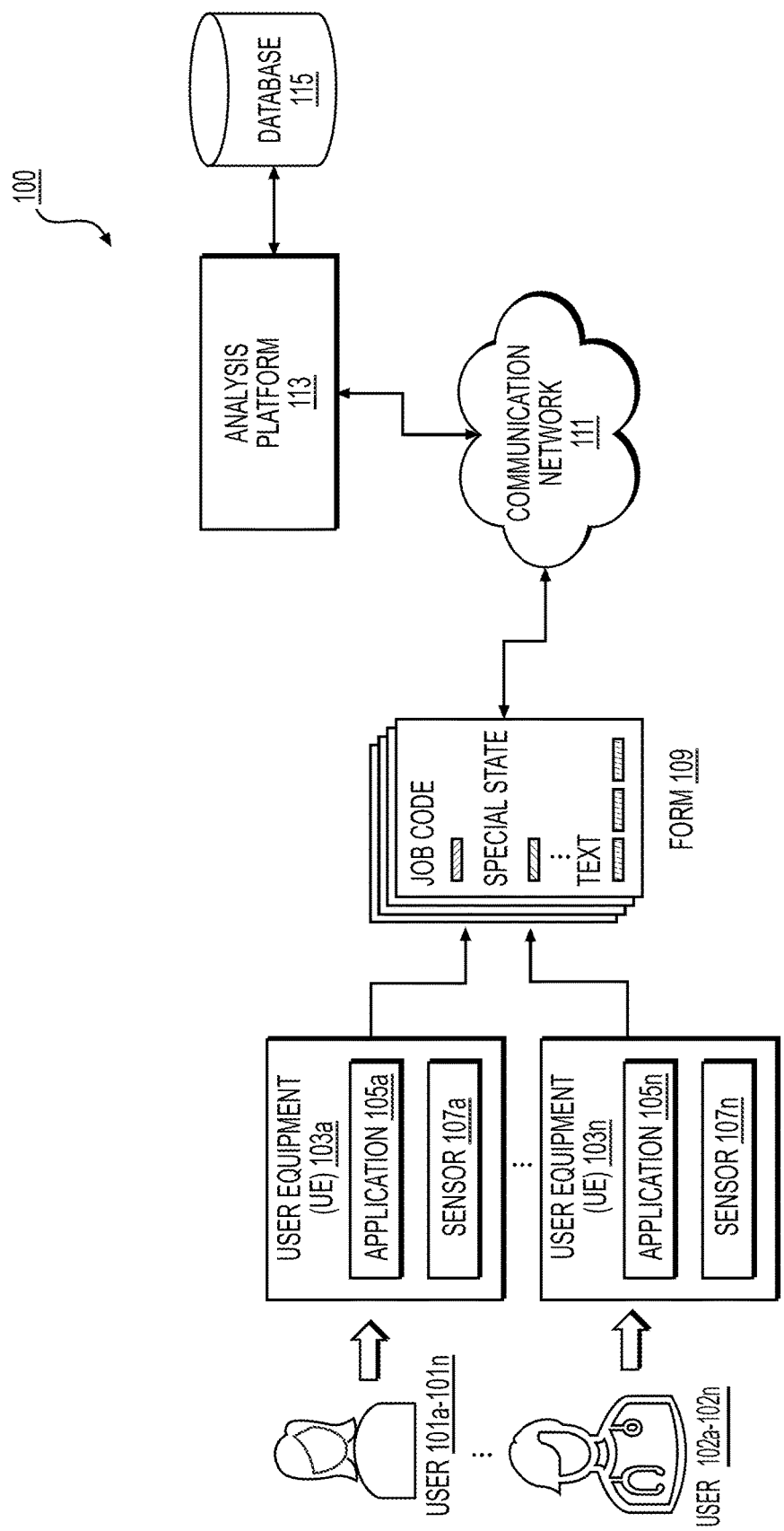
FIG. 1 is a diagram of a system capable of processing, in real-time or near real-time, one or more forms to automatically adjudicate religious exemptions, according to aspects of the disclosure.

While principles of the present disclosure are described herein with reference to illustrative embodiments for particular applications, it should be understood that the disclosure is not limited thereto. Those having ordinary skill in the art and access to the teachings provided herein will recognize additional modifications, applications, embodiments, and substitution of equivalents all fall within the scope of the embodiments described herein. Accordingly, the invention is not to be considered as limited by the foregoing description.

Various non-limiting embodiments of the present disclosure will now be described to provide an overall understanding of the principles of the structure, function, and use of systems and methods disclosed herein for processing forms to automatically adjudicate religious exemptions.

Centers for Disease Control and Prevention (CDC) offers religious exemptions from vaccinations for various infectious diseases, however, rules and regulations on religious exemptions change frequently with every exposure occurrence. Furthermore, the federal government, state government, and private companies each have their own rules and regulations regarding religious exemptions. Such varying requirements of religious exemptions make the adjudication process challenging.

The majority of state governments now allow religious exemptions to decline vaccinations, hence requests for religious exemptions have grown substantially. With the influx of exemption requests, manpower shortages are evident, and adjudication of religious exemptions is becoming more difficult. As an example, user A is employed with an institutional special needs plans (ISNP) business and is required to visit the members' homes to administer care. The state government requires user A to get vaccinated, however, due to specific religious beliefs, user A has applied for exemption under religious grounds. Since user A cannot return to work without approval of the exemption request, the adjudication process needs to be expedited. In general, the adjudication process is time-consuming because the regulations are fairly new and the explanation of the religious beliefs involves a human element that puts pressure on the reviewing team to fairly determine the eligibility of the participants, e.g., people may fabricate a story to seek exemptions from vaccination requirements. Furthermore, the reviewing team should be skillful to understand and adapt to the changing private, state, and federal regulations. Due to these circumstances, only a few religious exemption requests may get approved timely amongst thousands of requests. This demonstrates the complexity of the adjudication process and the time it takes for fair decision making. It is important to efficiently adjudicate religious exemptions with care and precision, and without any bias to protect the patients and contain exposure risks.

The existing health system does not utilize the ubiquitous modern technological infrastructure to address the backlog, the delays in processing, and the unconscious bias. The existing solution involves (i) ramping up resources and workforce to manually collect completed paper forms and manually process them, (ii) encouraging users to submit digital versions of the forms, or (iii) implementing independent reviews of the forms by outlining processes and protocols to ensure a bias-free assessment. However, information submitted through paper forms becomes stale with frequently changing rules and regulations, and implementing independent reviews is time-consuming, costly, and does not guarantee an absence of biases resulting from the manual review process.

As an example of the existing health system's shortcomings, user A, a physician in the state of Texas, has filed a request for a religious exemption offered by the state, in which user A provides employment information, location information, state information, and an explanation on the reason he is requesting an exemption under religious grounds. Despite the shortage of healthcare workers, user A has to wait for approval of his requests before he can continue to examine patients. Moreover, service providers, e.g., reviewing group that adjudicates religious exemptions, need to train someone on an urgent basis to understand the request under the religious grounds and whether the request qualifies under the religious exemption offered by the state government. It is challenging for the reviewer to assess, without any bias, the authenticity of religious requests and determine that the request satisfies all the legal requirements.

The present disclosure may solve one or more of the problems set forth above and/or other problems. The present disclosure teaches a method that adopts NLP and text analytics to analyze and interpret data in forms, e.g., vaccination exemption forms, to automatically adjudicate religious exemptions. The present disclosure teaches monitoring, in real-time or near real-time, the state or federal rules, and automatically updating the forms, in real-time or near real-time, based on the changing state or federal rules. The embodiments of the present disclosure remove manual bias, e.g., cultural bias, cognitive bias, information bias, etc., while adjudicating religious exemptions.

System 100 of FIG. 1 introduces the capability to employ NLP and text analytics tools to analyze the text on exemption forms or applications to automatically adjudicate exemption requests. Since religious exemption requests may include personal and faith-based arguments and statements, employing NLP algorithms and offering training based on several different inputs removes manual bias, e.g., cultural, cognitive, or information bias, during the adjudication of exemption requests.

FIG. 1 introduces a capability to implement modern communication and data processing capabilities into methods and systems for processing, in real-time or near real-time, one or more forms to automatically adjudicate religious exemptions, according to one example embodiment. FIG. 1, an example architecture of one or more example embodiments of the present invention, includes system 100 that comprises user 101a-101n (collectively referred to as user 101), user 102a-102n (collectively referred to as user 102), user equipment (UE) 103a-103n (collectively referred to as UE 103) that includes application 105a-105n (collectively referred to as application 105) and sensor 107a-107n (collectively referred to as sensor 107), form 109, communication network 111, analysis platform 113, and database 115.

In one embodiment, user 101 may be a person or a group of people interacting with a user interface or a web interface of UE 103 to access a service for vaccination exemptions. In one example embodiment, user 101 may include a registered patient, a potential patient, a returning patient, a visiting patient, an authorized user, a visiting user, etc., that provides contextual information, e.g., religious information, job description, location information, health-related information, etc., to exemption applications to request an exemption from vaccination requirements. It is understood that user 101 may provide contextual information for any other health-related services.

In one embodiment, user 102 may be a service provider, e.g., physicians, nurses, healthcare professionals, medical staff, etc., or an employee of a private or government entity, that may review medical forms associated with user 101 to provide a set of rules, e.g., specialized religious indicators or health indicators. The set of rules may be utilized by analysis platform 113 while adjudicating religious exemptions. In one example embodiment, analysis platform 113 may select at least one form 109, e.g., rejected form 109 or flagged form 109, for special review by user 102. Analysis platform 113 may communicate with user 102 for their feedback, whereupon user 102 may review at least one form 109 to provide a recommendation, e.g., an assessment regarding exemptions from vaccinations.

In one embodiment, UE 103 may include, but is not restricted to, any type of a mobile terminal, wireless terminal, fixed terminal, or portable terminal. Examples of the UE 103, may include, but are not restricted to, a mobile handset, a wireless communication device, a station, a unit, a device, a multimedia computer, a multimedia tablet, an Internet node, a communicator, a desktop computer, a laptop computer, a notebook computer, a netbook computer, a tablet computer, a Personal Communication System (PCS) device, a personal navigation device, a Personal Digital Assistant (PDA), a digital camera/camcorder, an infotainment system, a dashboard computer, a television device, or any combination thereof, including the accessories and peripherals of these devices, or any combination thereof. In addition, the UE 103 may facilitate various input means for receiving and generating information, including, but not restricted to, a touch screen capability, a keyboard, and keypad data entry, a voice-based input mechanism, and the like. Any known and future implementations of the UE 103 may also be applicable.

In one embodiment, application 105 may include various types of applications such as, but not restricted to, content provisioning applications, networking applications, software applications, imaging applications, multimedia applications, and the like. In one embodiment, application 105 at UE 103 may act as a client for analysis platform 113 and may perform one or more functions associated with the functions of analysis platform 113 by interacting with analysis platform 113 over communication network 111.

By way of example, sensor 107 may be any type of sensor. In one embodiment, sensor 107 may include, for example, a network detection sensor for detecting wireless signals or receivers for different short-range communications (e.g., Bluetooth, Wi-Fi, Li-Fi, near field communication (NFC), etc.), a global positioning sensor for gathering location data, a camera/imaging sensor for gathering image data, an audio/video recorder for gathering audio/video data, and the like.

In one embodiment, form 109 may be an electronic representation of a religious exemption form or a more general version of a form. Form 109 may include a plurality of data fields, and user 101 may input, via a user interface of UE 103, religious information, health-related information, etc., into the plurality of data fields to request exemptions from vaccination requirements. Examples of electronic representation may include portable document format (PDF), word document, rich text format (RTF), fillable web form (e.g., a webpage with fillable data fields), or any other suitable electronic format as would be understood in the art. There may be multiple ways of entering information into form 109, including typing text in a word document, filling in a data field of a PDF form, filling in a data field of a web form, or simply signing a pre-filled form. User 101 may also print form 109, enter the information by hand, and submit a scanned copy for further processing.

In one embodiment, various elements of system 100 may communicate with each other through communication network 111. Communication network 111 may support a variety of different communication protocols and communication techniques. In one embodiment, communication network 111 allows analysis platform 113 to communicate with UE 103 and database 115. The communication network 111 of system 100 includes one or more networks such as a data network, a wireless network, a telephony network, or any combination thereof. It is contemplated that the data network may be any local area network (LAN), metropolitan area network (MAN), wide area network (WAN), a public data network (e.g., the Internet), short range wireless network, or any other suitable packet-switched network, such as a commercially owned, proprietary packet-switched network, e.g., a proprietary cable or fiber-optic network, and the like, or any combination thereof. In addition, the wireless network may be, for example, a cellular communication network and may employ various technologies including 5G (5th Generation), 4G, 3G, 2G, Long Term Evolution (LTE), wireless fidelity (Wi-Fi), Bluetooth®, Internet Protocol (IP) data casting, satellite, mobile ad-hoc network (MANET), vehicle controller area network (CAN bus), and the like, or any combination thereof.

In one embodiment, analysis platform 113 may be a platform with multiple interconnected components. Analysis platform 113 may include one or more servers, intelligent networking devices, computing devices, components, and corresponding software for employing NLP and text analytics tools to analyze the text on exemption forms or applications to automatically adjudicate exemption requests. In addition, it is noted that analysis platform 113 may be a separate entity of system 100.

Analysis platform 113 may calculate the authenticity of the expressed religious beliefs without any bias. In one embodiment, analysis platform 113 may create a library of religious exemption forms in available formats and templates. The religious exemption forms are categorized based on various criteria, e.g., state government, the federal government, public health agencies, employers or private companies, etc. Analysis platform 113 may establish real-time polling to read the changes or updates to the forms and keep the religious exemption forms up-to-date. In one embodiment, analysis platform 113 may analyze and assign a score for each completed question and employs a method to ensure all required fields are complete. Analysis platform 113 may identify religious statements/reasoning, demographic details, job code, nature of work, health-related information, and/or location information, associated with user 101. In one embodiment, analysis platform 113 may employ NLP algorithms to evaluate the sentiment reflected in religious statement/reasoning. Analysis platform 113 may assign an NLP score for the specific religious description that was entered by the user. Analysis platform 113 may then define a threshold score range as per specific requirement and establish acceptance criteria for auto adjudication. Further details of analysis platform 113 are provided below.

In one embodiment, database 115 may be any type of database, such as relational, hierarchical, object-oriented, and/or the like, wherein data are organized in any suitable manner, including as data tables or lookup tables. In one embodiment, database 115 may store and manage multiple types of information that can provide means for aiding in the content provisioning and sharing process, e.g., database 115 includes information pertaining to available religious exemptions that belong to various state governments, the federal government, public health institutions, employers or private companies, etc., including laws and regulations associated with religious exemptions. Database 115 may also store information provided by users to apply for religious exemptions, such as completed application forms stored in one or more data formats (e.g., a picture, a word processing document, a PDF document, etc.). In an embodiment, database 115 may include a machine-learning based training database with pre-defined mapping defining a relationship between various input parameters and output parameters based on various statistical methods. In an embodiment, the training database may include machine-learning algorithms to learn mappings between input parameters related to the user such as religious information, employment information, location information, user's health records, etc., and inputs provided by the health or regulation experts, e.g., user 102. In an embodiment, the training database may include a dataset that may include data collections that are not subject-specific, e.g., data collections based on population-wide observations, local, regional or super-regional observations, and the like. Exemplary datasets include religious information, health-related information, geographic data, location information, occupational information, environmental information, scientific and medical-related periodicals and journals, research studies data, and the like. In an embodiment, the training database is routinely updated and/or supplemented based on machine learning methods.

By way of example, UE 103, analysis platform 113, and database 115 may communicate with each other and other components of the communication network 111 using well known, new or still developing protocols. In this context, a protocol includes a set of rules defining how the network nodes within the communication network 111 interact with each other based on information sent over the communication links. The protocols are effective at different layers of operation within each node, from generating and receiving physical signals of various types, to selecting a link for transferring those signals, to the format of information indicated by those signals, to identifying which software application executing on a computer system sends or receives the information. The conceptually different layers of protocols for exchanging information over a network are described in the Open Systems Interconnection (OSI) Reference Model.

Communications between the network nodes are typically effected by exchanging discrete packets of data. Each packet typically comprises (1) header information associated with a particular protocol, and (2) payload information that follows the header information and contains information that may be processed independently of that particular protocol. In some protocols, the packet includes (3) trailer information following the payload and indicating the end of the payload information. The header includes information such as the source of the packet, its destination, the length of the payload, and other properties used by the protocol. Often, the data in the payload for the particular protocol includes a header and payload for a different protocol associated with a different, higher layer of the OSI Reference Model. The header for a particular protocol typically indicates a type for the next protocol contained in its payload. The higher layer protocol is said to be encapsulated in the lower layer protocol. The headers included in a packet traversing multiple heterogeneous networks, such as the Internet, typically include a physical (layer 1) header, a data-link (layer 2) header, an internetwork (layer 3) header and a transport (layer 4) header, and various application (layer 5, layer 6 and layer 7) headers as defined by the OSI Reference Model.

Figure 2:
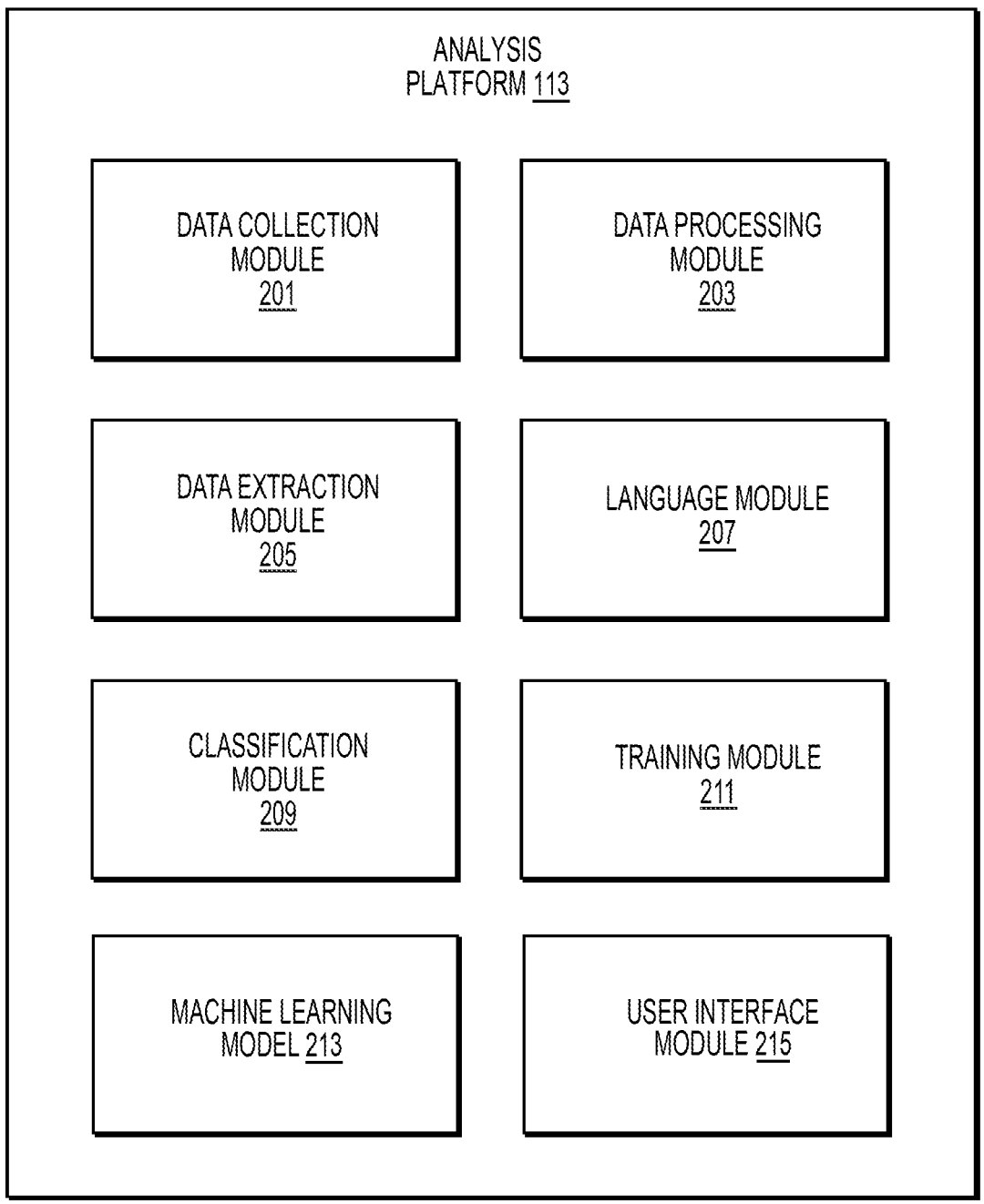
FIG. 2 is a diagram of the components of analysis platform 113, according to aspects of the disclosure.

FIG. 2 is a diagram of the components of analysis platform 113, according to one example embodiment. As used herein, terms such as "component" or "module" generally encompass hardware and/or software, e.g., that a processor or the like may use to implement associated functionality. By way of example, analysis platform 113 includes one or more components for processing, in real-time or near real-time, one or more forms to automatically adjudicate religious exemptions. It is contemplated that the functions of these components may be combined in one or more components or performed by other components of equivalent functionality. In one embodiment, analysis platform 113 comprises data collection module 201, data processing module 203, data extraction module 205, language module 207, classification module 209, training module 211, machine learning model 213, user interface module 215, or any combination thereof.

In one embodiment, data collection module 201 may collect relevant data, e.g., religion-related information, location data, employment data, health data, etc., associated with user 101 through various data collection techniques. In one embodiment, the data collection module 201 may use a web-crawling and/or other types of data collection mechanism to access various databases, e.g., database 115, or other information sources, e.g., state government websites, federal government websites, public health agencies websites, etc. (e.g., information provided by users to fill in data fields of web application forms or other types of electronic forms for religious exemptions), to collect relevant data associated with user 101 and form 109. In one embodiment, data collection module 201 may include various software applications, e.g., data mining applications in Extended Meta Language (XML), that automatically search for and return relevant data regarding user 101. In one embodiment, data collection module 201 may parse and arrange the data into a common format that can be easily processed by other modules and platforms. In one example embodiment, data collection module 201 may collect, via form 109, religion-related information and/or employment data associated with user 101. In another example embodiment, data collection module 201 may collect, in real-time or real-time, location data of user 101 via sensor 107, e.g., a global positioning system (GPS). In a further example embodiment, data collection module 201 may collect health data associated with user 101 via a variety of UE 103, e.g., monitoring devices that measures the physiological parameters, e.g., heart rate, blood oxygen saturation levels, respiratory rate, glucose level, blood pressure, weight, etc., of user 101.

In one embodiment, data processing module 203 may process data collected by data collection module 201. The data processing techniques may include, but are not limited to, an optical character recognition (OCR) technique, an NLP technique, or a data cleansing technique. In one example embodiment, OCR may be applied to a scanned form 109, a picture of form 109 that includes text, and/or the like, to produce electronic data, e.g., text data. Converting printed text to electronic data allows the information represented by the printed text to be electronically edited, searched, stored more compactly, displayed online, and/or used in machine processes such as cognitive computing, machine translation, (extracted) text-to-speech, key data and text mining, and/or the like. Implementations of OCR may employ pattern recognition, artificial intelligence, computer vision, and/or the like. In one example embodiment, the NLP technique may be applied to analyze, understand, and derive meaning from the texts written by humans. Rather than treating text like a mere sequence of symbols, NLP considers a hierarchical structure of language, e.g., several words may be treated as a phrase, several phrases may be treated as a sentence, and the words, phrases, and/or sentences convey ideas that can be interpreted. NLP can be applied to analyze text, allowing machines to understand how humans speak/write, enabling real world applications such as automatic text summarization, sentiment analysis, topic extraction, named entity recognition, parts-of-speech/text tagging, relationship extraction, stemming, and/or the like. In one example embodiment, data cleansing technique may include detecting corrupt or inaccurate data, e.g., records from a database, and then replacing, modifying, or deleting the corrupt or inaccurate data. The data cleansing technique may detect and correct inconsistencies originally caused by user entry errors, corruption during transmission or storage, or by utilization of different definitions for similar data in different data stores or form 109. The data cleansing technique may include removing typographical errors or validating and correcting values against a known list of entities. For example, validation may be strict, e.g., rejecting any address that does not have a valid postal code, or fuzzy, e.g., correcting records that partially match existing, known records. The data cleansing technique may also include cleaning data by cross-checking the data with a validated data set, standardizing the data by changing a reference data set to a new standard, e.g., use of standard codes, and/or the like. Additionally, the data cleansing technique may include data enhancement, where data is made more complete by adding related information.

In one embodiment, data extraction module 205 receives the processed data from data processing module 203 or directly from data collection module 201. The data extraction module 205 may extract relevant information, e.g., fields in the religious exemption form (including text), job code, demographic details, location information, etc., from the received data. In one embodiment, data extraction module 205 may extract data based, at least in part, on a notification that a record has been changed, detecting a record has been modified, per system requirements, per schedule, or a combination thereof. In one example embodiment, data extraction module 205 may utilize NLP techniques to process form 109 to identify relevant information and phrases, e.g., noun phrases or predicate phrases. Data extraction module 205 may extract the relevant information and phrases via various extraction techniques, e.g., a full extraction mechanism or an incremental extraction mechanism. Data extraction module 205 may generate a data object such as a new document, e.g., a training document, from the extracted information to build, train, or be processed by a language model via language module 207. The new document has a structure that combines all the fields in the religious exemption form which is provided to language module 207, e.g., religious exemption language model (RELM).

In one embodiment, language module 207 may receive the new document from data extraction module 205, and may review all features of the new document as one single text document to build a semantic relationship between them. The language module 207 may use the features, e.g., texts, fields, etc., in form 109 as a language, and may utilize one or more language modeling techniques, e.g., statistical models, neural-network models, transformers models, etc., to represent each feature in form 109. Features that appear together in form 109 have latent relations, but language module 207 may represent the relationship between different features found in form 109. For example, language module 207 may look at all features in form 109 and may represent the relationship between different features as they occur together, rather than looking at the features separately. To emphasize the notion of using the features in form 109 as a language, consider the following example:

"The brown fox jumped over the lazy dog"

This sentence (e.g., natural language text) may be transmitted to an NLP in natural language, i.e., "The", "brown", "fox", "jumped", "over", "the", "lazy", "dog". Similarly, features in form 109 may contain the following in Table 1:

TABLE 1

| Special State | Certified from state | Site they work at | Job Code | Location code | Text |
|---|---|---|---|---|---|
| TX | LA | Clinic | RN | TX078 | My religion . . . |

In one embodiment, language module 207 may transform the input from text format to numerical representations, i.e., embeddings, using one or more language modelling techniques discussed above. These embeddings may project the features in form 109, e.g., job codes, text, etc., into a geometric hyperspace where semantically similar features are close to each other. In one example embodiment, language module 207 may add '#' to features that are not natural texts, e.g., #TX, #LA, #Clinic, #RN, #TX078, to differentiate the features from natural texts. The language module 207 may input tokens to the language modeling technique as "#TX", "#LA", "#Clinic", "#RN", "#TX078", "my", "religion", etc. This representation is then used with a classification model to assign a score to each form.

In one embodiment, classification module 209 may, using a classification model (e.g., a machine learning model/algorithm for classification), analyze texts and then assign a set of predefined tags or categories based on their context. In one embodiment, classification module 209 may implement a rule-based approach to categorize texts into an organized group using a set of pre-defined linguistic rules. These rules may instruct the system to use semantically relevant elements of a text to identify relevant categories based on its content. In another embodiment, classification module 209 may implement a machine learning text classification to make classifications based on past observations. By using pre-labeled examples as training data, machine learning models/algorithms, e.g., Naive Bayes, Support Vector Machines (SVM), K-Nearest Neighbors (KNN), Decision Tree, deep learning, etc., can learn the different associations between pieces of texts, and that particular output, i.e., tags, is expected for a particular input, i.e., text. A "tag" is the pre-determined classification or category that any given text could fall into. In a further embodiment, classification module 209 may implement a hybrid system to combine a machine learning-trained base classifier with a rule-based system to further improve the results.

In one embodiment, classification module 209 may perform a variety of calculations to assign scores, e.g., NLP scores, to the embeddings. In one example embodiment, classification module 209 may perform a weighted threshold per specific requirements, e.g., special state, certified from state, site they work at, job code, location code, texts, etc., to assign scores. Classification module 209 may also employ text analytics to evaluate the sentiment reflected in the texts of form 109 to calculate an NLP score. As illustrated in the table of FIG. 4A, varying NLP scores are generated for the corresponding embeddings (i.e., for the corresponding exemption requests represented by the embeddings). In one embodiment, a higher NLP score, e.g., 65, may indicate strong semantic relationships between the language components of form 109.

In another example embodiment, classification module 209 may define a decision threshold establishing a range of acceptable NLP scores (e.g., a decision threshold score range). In one embodiment, analysis platform 109 may determine a decision threshold based, at least in part, on the location information and the type of service provided by the service provider. In one example embodiment, the service provider is a primary care facility that treats life-threatening health conditions and is located in the state of Florida. Though the state regulations in Florida are lenient, analysis platform 109 may establish a stringent decision threshold for the service provider based on the service provided. In one embodiment, analysis platform 109 may tune, in real-time or near real-time, the decision threshold with changing information, e.g., changing location information, change in the service offered, etc. It should be understood that decision threshold may be calculated based on other parameters of form 109, e.g., health condition of user 101, employment information of user 101, religious information of user 101, etc. Classification module 209 may compare the NLP score with the decision threshold. If the NLP score is within the range established by the decision threshold, the corresponding form or exemption request may be determined to be authentic. On the other hand, if the NLP score is not within the range established by the decision threshold, the corresponding form or exemption request may be determined to be inauthentic or non-authentic.

Classification module 209 may thus validate the NLP score against the decision threshold to establish acceptance criteria for auto adjudication. For example, if the NLP scores fall within the pre-defined range of the decision threshold, the religious exemption request may be approved. User 101 may be presented with an approval notification in the user interface of UE 103 upon determining the religious request is authentic and has met the confirmation criteria. On the other hand, if the exemption request has failed to meet the confirmation criteria, it is flagged for a special review. User 101 may be presented with a denial notification in the user interface of UE 103 upon determining the religious request is fraudulent (i.e., inauthentic or non-authentic).

In one embodiment, training module 211 may provide learning, or training, to machine learning model 213 by providing training data, e.g., data from other modules, that contains input and correct output, to allow machine learning model 213 to learn over time. The training may be performed based on the deviation of a processed result from a documented result when the inputs are fed into machine learning model 213, e.g., an algorithm measures its accuracy through the loss function, adjusting until the error has been sufficiently minimized. Training module 211 may conduct the training in any suitable manner, e.g., in batches, and may include any suitable training methodology. Training may be performed periodically, and/or continuously, e.g., in real-time or near real-time. Further details of training a machine learning model are provided below.

In one embodiment, machine learning model 213 may receive the training data from training module 211 to learn patterns of various exemption requests to detect an unusual request pattern, e.g., an anomaly, that could influence the NLP score or decision score. The ordering of the training data may be randomized during training. Machine learning model 213 may visualize the training data to identify relevant relationships between different variables and identify any data imbalances. The training data may be split into two parts where one part is for training the model and the other part is for validating the trained model, de-duplicating, normalizing, correcting errors in the training data, and so on. Machine learning model 213 may implement various machine learning techniques (e.g., language modelling techniques, classification techniques, etc.) discussed in the present disclosure.

In one embodiment, user interface module 215 may enable a presentation of a graphical user interface (GUI) in UE 103. User interface module 215 may employ various application programming interfaces (APIs) or other function calls corresponding to application 105 on UE 103, thus enabling the display of graphics primitives such as icons, menus, buttons, data entry fields, etc., associated with form 109. In another embodiment, user interface module 215 may cause interfacing of guidance information with user 101 to include, at least in part, one or more annotations, audio messages, video messages, or a combination thereof while completing form 109. In one embodiment, user interface module 215 may comprise a variety of interfaces, for example, interfaces for data input and output devices, referred to as I/O devices, storage devices, and the like. Still further, user interface module 215 may be configured to operate in connection with augmented reality (AR) processing techniques, wherein various applications, graphic elements, and features may interact.

The above presented modules and components of analysis platform 113 may be implemented in hardware, firmware, software, or a combination thereof. Though depicted as a separate entity in FIG. 2, it is contemplated that analysis platform 113 may be implemented for direct operation by respective UE 103. As such, analysis platform 113 may generate direct signal inputs by way of the operating system of UE 103. In another embodiment, one or more of the modules 201-215 may be implemented for operation by respective UEs, as analysis platform 113, or a combination thereof. The various executions presented herein contemplate any and all arrangements and models.

Figure 3:
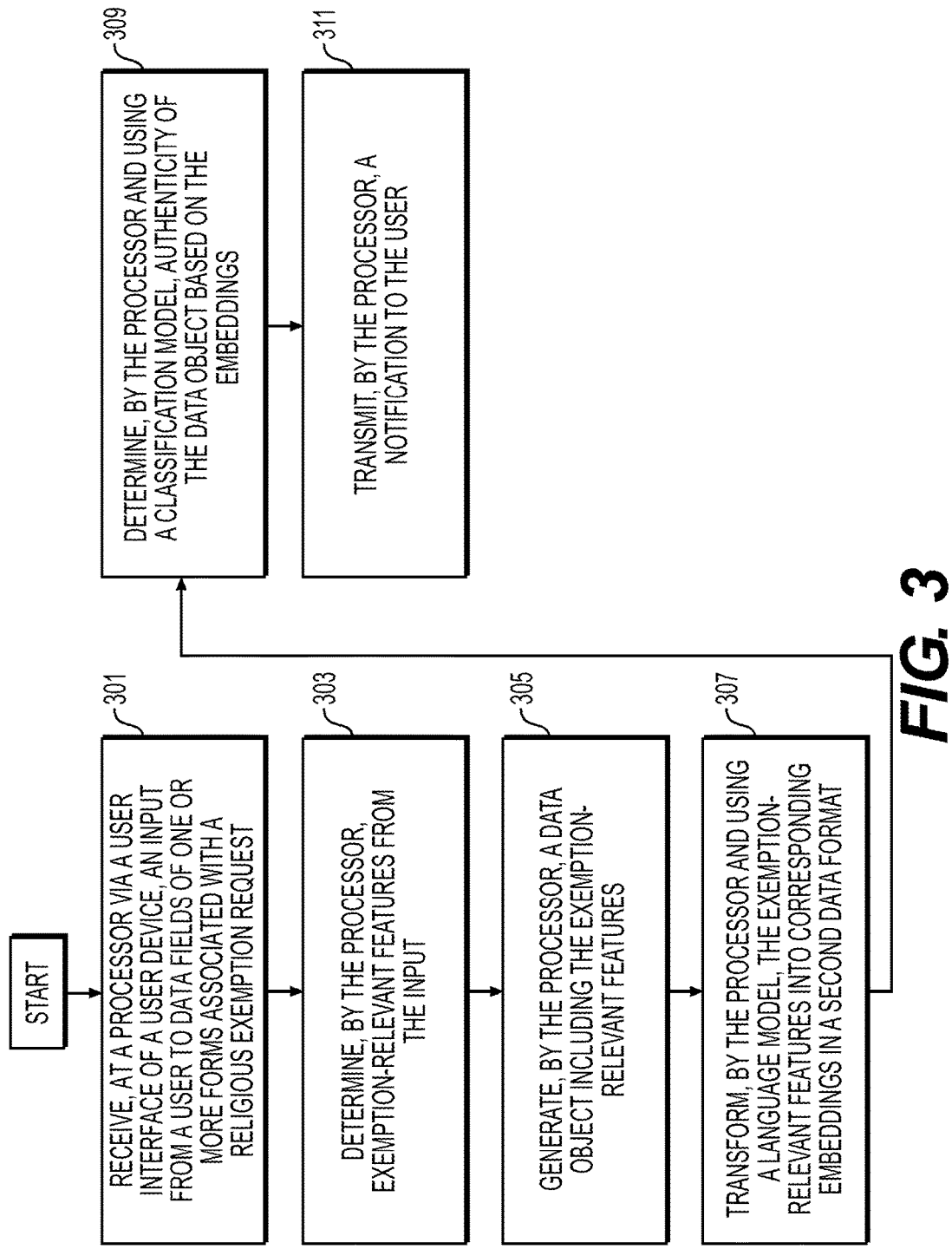
FIG. 3 is a flowchart of a process for utilizing NLP and text analytics to analyze, in real-time or near real-time, texts of forms to automatically adjudicate religious exemptions, according to aspects of the disclosure.
Figure 6:
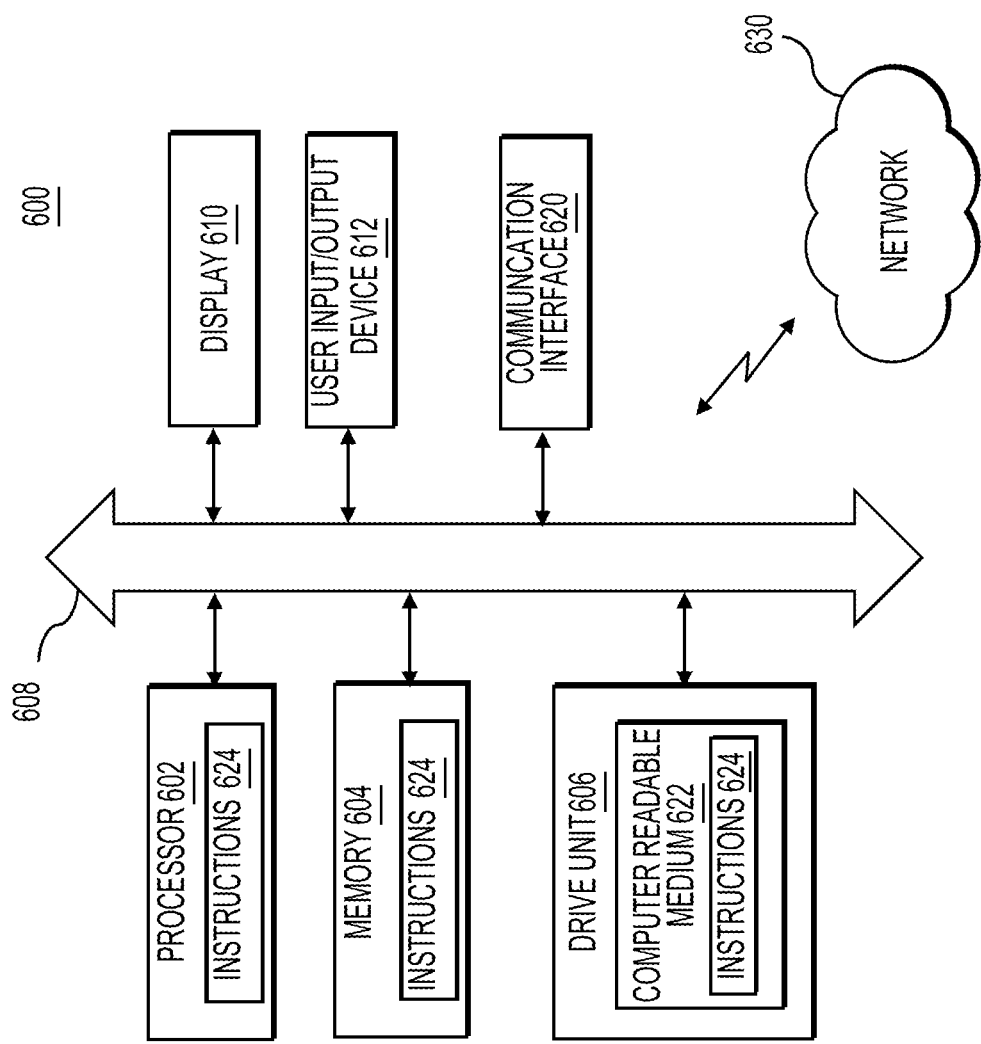
FIG. 6 illustrates an implementation of a general computer system that may execute techniques presented herein.

FIG. 3 is a flowchart of a process for utilizing NLP and text analytics to analyze, in real-time or near real-time, texts of forms to automatically adjudicate religious exemptions, according to one example embodiment. In various embodiments, analysis platform 113 and/or any of modules 201-215 may perform one or more portions of process 300 and may be implemented in, for instance, a chip set including a processor and a memory as shown in FIG. 6. As such, analysis platform 113 and/or any of modules 201-215 may provide means for accomplishing various parts of process 300, as well as means for accomplishing embodiments of other processes described herein in conjunction with other components of system 100. Although process 300 is illustrated and described as a sequence of steps, it is contemplated that various embodiments of process 300 may be performed in any order or combination and need not include all of the illustrated steps.

In step 301, analysis platform 113 may receive, via a user interface of UE 103, an input from user 101 to the data fields of form 109 associated with a religious exemption request. The input is in a first data format, e.g., textual format, and includes location information, religious information, employment information, and/or demographic information associated with user 101. In one embodiment, analysis platform 113 may monitor, in real-time or near real-time, the input from user 101 to determine the completion of the data fields of form 109. Analysis platform 113 may generate a notification in the user interface of UE 103 to alert the user regarding incomplete data fields and request the user for timely completion to initiate the exemption request process. In another embodiment, analysis platform 113 may collect and store form 109 in a database, e.g., database 115, in different formats and/or templates. The stored form 109 may be categorized based on the entity associated with the form, e.g., a service provider, a state government, and/or the federal government. Analysis platform 113 may monitor, in real-time or near real-time, changes in private, state, or federal laws or regulations pertaining to form 109. Analysis platform 113 may update, in real-time or near real-time, form 109 upon determining changes in state or federal laws or regulations to ensure the forms are up-to-date.

In step 303, analysis platform 113 may determine exemption-relevant features from the input. In one example embodiment, analysis platform 113 may process the input from user 101 to the data fields of form 109 to determine relevant information, e.g., religious statement or reasoning, job code, demographic details, location information, etc.

In step 305, analysis platform 113 may generate a data object (e.g., a document or a training document) including the exemption-relevant features. In one embodiment, analysis platform 113 may extract, via data extraction module 205, the exemption-relevant features from the data fields of form 109 to generate a data object. In one example embodiment, a data object is a training document that clusters the extracted exemption-relevant features, and may train language module 207 to build semantic relations between the extracted information.

In step 307, analysis platform 113 may transform, via language module 207 (i.e., using a language model), the exemption-relevant features into corresponding embeddings in a second data format. The embeddings represent semantic relations between the exemption-relevant features. In one embodiment, the one or more embeddings in the second data format are numerical representations that project the one or more exemption-relevant features in a geometric hyperspace based, at least in part, on semantic similarities relative to each other. In one embodiment, the language model applies a statistical model (e.g., Global Vectors for Word Representation (GloVe), etc.), a neural-network based model (e.g., word2vec, GPT, etc.), and/or a transformer model (Bidirectional Encoder Representations from Transformers (BERT), etc.) to transform the exemption-relevant features in the first data format into embeddings in the second data format. In one example embodiment, the statistical model(s) factorize a feature co-occurrence matrix built from a dataset of form 109. In one example embodiment, the neural-network based models predict a pair of features co-occurring together within a time threshold of each other.

In step 309, analysis platform 113 may determine, via classification module 209 (i.e., using a classification model), authenticity of the data object based on the embeddings. The classification model is trained using a plurality of embeddings representative of a plurality of exemption-relevant features. In one embodiment, analysis platform 113 may classify, via classification module 209, the data object based on the embeddings in the second data format. Analysis platform 113 may generate an NLP score based on the semantic relations and/or authenticity definitions between the embeddings. Analysis platform 113 may then compare the NLP score to a decision threshold to determine the authenticity of the data object and adjudicate religious exemptions. Analysis platform 113 may process, using a machine learning model 213, the data fields of form 109 to determine patterns pertaining to the religious exemption request. Analysis platform 113 may determine an unusual pattern in the religious exemption request that influences the NLP score, and may recalibrate the NLP score based on the unusual pattern. In one embodiment, analysis platform 113, via machine learning model 213, may detect unusual patterns that do not conform to regular arrangements and are suspicious. The unusual patterns may indicate values that do not correspond to expected values based on observation of similar data points in the same context. The unusual patterns may include errors in texts of form 109, an inadequate semantic relationship between the texts of form 109, inconsistent data, etc. In one example embodiment, it is standard for user 101 to elaborate on how complying with vaccination requirements substantially burdens his religious exercise or conflicts with his sincerely held religious beliefs. However, if user 101 states that he has previously received multiple vaccines or has held such religious beliefs for a short duration, e.g., a week or a few days, it indicates that user 101 is dishonest and the request is not authentic. Such unusual patterns may negatively impact the NLP score, thereby resulting in a lower NLP score.

In step 311, analysis platform 113 may transmit a notification in a user interface of UE 103 associated with user 101. The notification indicates an approval or a disapproval of the religious exemption request. In one embodiment, the disapproved religious exemption request is automatically queued in a review database based on temporal information, contextual information, or a combination thereof for additional review.

FIG. 4A depicts table 400 with a plurality of exemption requests and NLP scores assigned to the exemption requests, according to one example embodiment. In one embodiment, analysis platform 113, via user interface module 215, may generate a display of form 109 in UE 103. The data entry fields for form 109 may include, but are not limited to, special state 403, certified from state 405, site they work at 407, job code 409, and/or location code 411. User 101 may interact with the various user interface elements, e.g., virtual keyboard, icons, menus, buttons, etc., to input requested information in these data entry fields. Analysis platform 113 may process the input to generate NLP score 413 in accordance with the methods and processes discussed herein. Analysis platform 113 may then compare NLP score 413 with decision threshold 415 to determine the authenticity of the request. For example, analysis platform 113 may determine exemption requests, e.g., rows 402 and 406, to be authentic since NLP score 413 is within the range established by decision threshold 415. On the other hand, analysis platform 113 may determine exemption requests, e.g., rows 404 and 408, to be inauthentic or non-authentic because NLP score 413 is outside the range established by decision threshold 415. Analysis platform 113 may approve the authentic religious exemption requests, whilst the inauthentic or non-authentic religious exemption requests may be further reviewed or rejected.

Figure 4B:
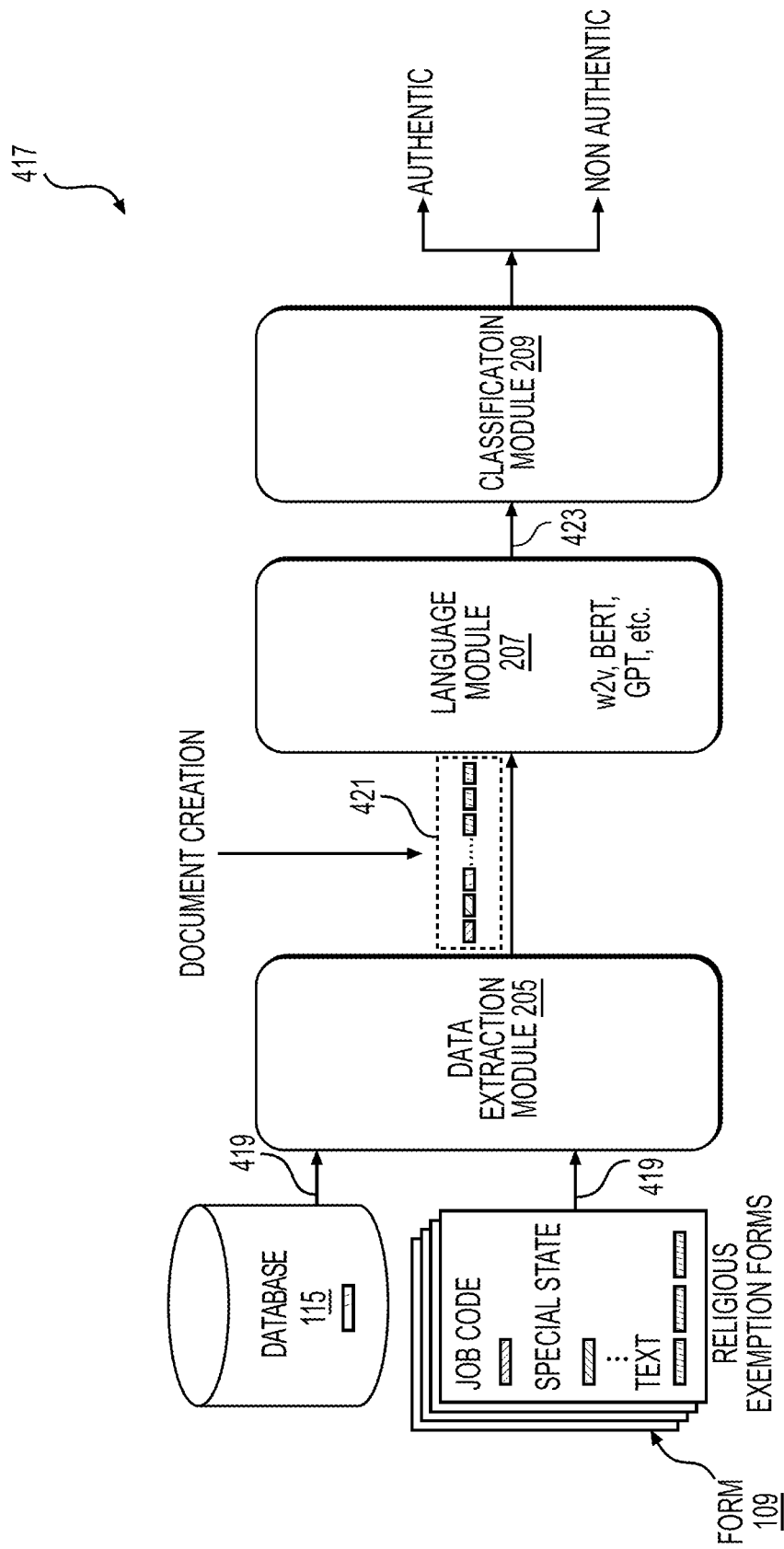
FIG. 4B is an architectural diagram that represents an NLP pipeline to determine the authenticity of religious exemption requests according to aspects of the disclosure.

FIG. 4B is an architectural diagram that represents an exemplary NLP pipeline 417 to determine the authenticity of religious exemption requests, according to one example embodiment. In step 419, data extraction module 205 may receive contextual information, e.g., religious statement/reasoning, employment information, location information, and/or demographic information, associated with user 101 from various data sources, e.g., form 109 and database 115. The contextual information may be received in a textual format, and data extraction module 205 may extract relevant information, e.g., texts from religious statements, job code, state rules and regulation, federal rules and regulations, current location of the user, etc., from the contextual information. In one embodiment, the selection of relevant information for extraction may be based, at least in part, on predefined criteria. The extracted information may be used to build/train language module 207.

In step 421, data extraction module 205 may create a new data object or document that includes or clusters the extracted information, and the new document may be inputted to language module 207 to determine semantic relations between the extracted information. In one embodiment, language module 207 may utilize the new document to build a language model (LM) by transforming the extracted information in a textual format into numerical representations, i.e., embeddings. These embeddings may project the relevant features into a geometric hyperspace where semantically similar features are close to each other. In one example embodiment, different language modeling techniques may be utilized to generate embeddings from codes, for example, (a) statistical models such as GloVe may factorize a feature co-occurrence matrix built from religious exemption forms dataset; (b) neural-network-based models such as word2vec may predict whether a pair of features co-occur together within a short window of each other; or (c) transformers models such as BERT, where embeddings are context-sensitive due to the self-attention mechanism in transformers. In one embodiment, language modelling techniques may be selected based on pre-defined requirements.

In step 423, language module 207 may transmit the embeddings to classification module 209 to classify the documents. In one embodiment, classification module 209 may generate NLP scores against a pre-defined decision threshold, and may validate these scores against an established threshold, and may signal user 101 with the outcome. For example, if the religious exemption request has met the positive confirmation criteria, user 101 may receive a notification in UE 103 outlining the specific details pertaining to the approval of the religious exemption request and the type of accommodation that has been provided. On the other hand, if the religious exemption request has failed the criteria, then the request is flagged and is automatically pushed into a queue for a special review by an independent review team, e.g., user 102. Automated notifications of denials are sent when fraudulent information is detected.

Figure 5:
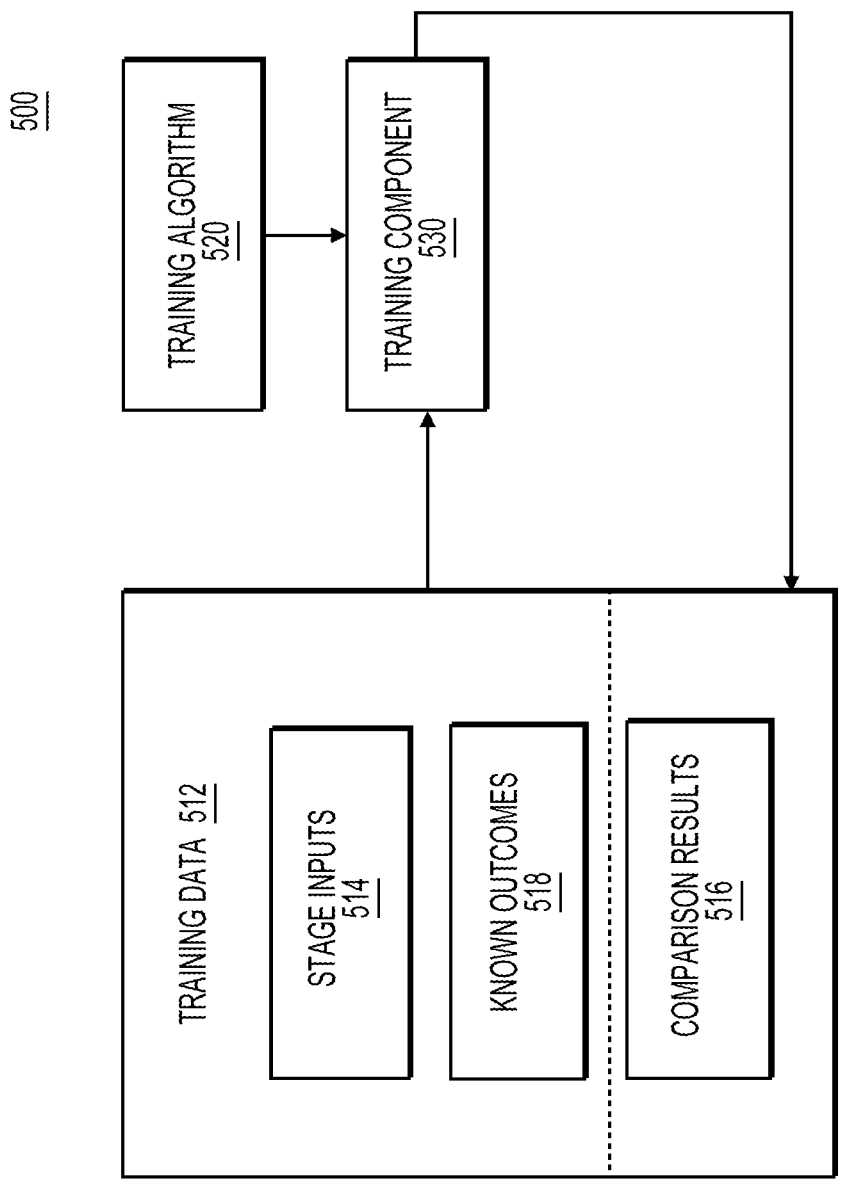
FIG. 5 shows an example machine learning training flow chart.

One or more implementations disclosed herein include and/or may be implemented using machine learning model. For example, one or more of the modules of analysis platform 113, e.g., language module 207, classification module 209, training module 211, machine learning model 213, etc., may be implemented using a machine learning model and/or may be used to train the machine learning model. A given machine learning model may be trained using the data flow 500 of FIG. 5. Training data 512 may include one or more of stage inputs 514 and known outcomes 518 related to the machine learning model to be trained. The stage inputs 514 may be from any applicable source including text, visual representations, data, values, comparisons, stage outputs, e.g., one or more outputs from one or more steps from FIG. 3. The known outcomes 518 may be included for the machine learning models generated based on supervised or semi-supervised training. An unsupervised machine learning model may not be trained using known outcomes 518. Known outcomes 518 may include known or desired outputs for future inputs similar to or in the same category as stage inputs 514 that do not have corresponding known outputs.

The training data 512 and a training algorithm 520, e.g., one or more of the modules implemented using the machine learning model and/or may be used to train the machine learning model, may be provided to a training component 530 that may apply the training data 512 to the training algorithm 520 to generate the machine learning model. According to an implementation, the training component 530 may be provided comparison results 516 that compare a previous output of the corresponding machine learning model to apply the previous result to re-train the machine learning model. The comparison results 516 may be used by training component 530 to update the corresponding machine learning model. The training algorithm 520 may utilize machine learning networks and/or models including, but not limited to a deep learning network such as Deep Neural Networks (DNN), Convolutional Neural Networks (CNN), Fully Convolutional Networks (FCN) and Recurrent Neural Networks (RCN), probabilistic models such as Bayesian Networks and Graphical Models, classifiers such as K-Nearest Neighbors, and/or discriminative models such as Decision Forests and maximum margin methods, models specifically discussed in the present disclosure, or the like.

The machine learning model used herein may be trained and/or used by adjusting one or more weights and/or one or more layers of the machine learning model. For example, during training, a given weight may be adjusted (e.g., increased, decreased, removed) based on training data or input data. Similarly, a layer may be updated, added, or removed based on training data/and or input data. The resulting outputs may be adjusted based on the adjusted weights and/or layers.

In general, any process or operation discussed in this disclosure that is understood to be computer-implementable, such as the process illustrated in FIG. 3 may be performed by one or more processors of a computer system as described herein. A process or process step performed by one or more processors may also be referred to as an operation. The one or more processors may be configured to perform such processes by having access to instructions (e.g., software or computer-readable code) that, when executed by the one or more processors, cause the one or more processors to perform the processes. The instructions may be stored in a memory of the computer system. A processor may be a central processing unit (CPU), a graphics processing unit (GPU), or any suitable types of processing unit.

A computer system, such as a system or device implementing a process or operation in the examples above, may include one or more computing devices. One or more processors of a computer system may be included in a single computing device or distributed among a plurality of computing devices. One or more processors of a computer system may be connected to a data storage device. A memory of the computer system may include the respective memory of each computing device of the plurality of computing devices.

FIG. 6 illustrates an implementation of a general computer system that may execute techniques presented herein. The computer system 600 can include a set of instructions that can be executed to cause the computer system 600 to perform any one or more of the methods or computer based functions disclosed herein. The computer system 600 may operate as a standalone device or may be connected, e.g., using a network, to other computer systems or peripheral devices.

Unless specifically stated otherwise, as apparent from the following discussions, it is appreciated that throughout the specification, discussions utilizing terms such as "processing," "computing," "calculating," "determining", analyzing" or the like, refer to the action and/or processes of a computer or computing system, or similar electronic computing device, that manipulate and/or transform data represented as physical, such as electronic, quantities into other data similarly represented as physical quantities.

In a similar manner, the term "processor" may refer to any device or portion of a device that processes electronic data, e.g., from registers and/or memory to transform that electronic data into other electronic data that, e.g., may be stored in registers and/or memory. A "computer," a "computing machine," a "computing platform," a "computing device," or a "server" may include one or more processors.

In a networked deployment, the computer system 600 may operate in the capacity of a server or as a client user computer in a server-client user network environment, or as a peer computer system in a peer-to-peer (or distributed) network environment. The computer system 600 can also be implemented as or incorporated into various devices, such as a personal computer (PC), a tablet PC, a set-top box (STB), a personal digital assistant (PDA), a mobile device, a palmtop computer, a laptop computer, a desktop computer, a communications device, a wireless telephone, a land-line telephone, a control system, a camera, a scanner, a facsimile machine, a printer, a pager, a personal trusted device, a web appliance, a network router, switch or bridge, or any other machine capable of executing a set of instructions (sequential or otherwise) that specify actions to be taken by that machine. In a particular implementation, the computer system 600 can be implemented using electronic devices that provide voice, video, or data communication. Further, while a computer system 600 is illustrated as a single system, the term "system" shall also be taken to include any collection of systems or sub-systems that individually or jointly execute a set, or multiple sets, of instructions to perform one or more computer functions.

As illustrated in FIG. 6, the computer system 600 may include a processor 602, e.g., a central processing unit (CPU), a graphics processing unit (GPU), or both. The processor 602 may be a component in a variety of systems. For example, the processor 602 may be part of a standard personal computer or a workstation. The processor 602 may be one or more general processors, digital signal processors, application specific integrated circuits, field programmable gate arrays, servers, networks, digital circuits, analog circuits, combinations thereof, or other now known or later developed devices for analyzing and processing data. The processor 602 may implement a software program, such as code generated manually (i.e., programmed).

The computer system 600 may include a memory 604 that can communicate via a bus 608. The memory 604 may be a main memory, a static memory, or a dynamic memory. The memory 604 may include, but is not limited to computer readable storage media such as various types of volatile and non-volatile storage media, including but not limited to random access memory, read-only memory, programmable read-only memory, electrically programmable read-only memory, electrically erasable read-only memory, flash memory, magnetic tape or disk, optical media and the like. In one implementation, the memory 604 includes a cache or random-access memory for the processor 602. In alternative implementations, the memory 604 is separate from the processor 602, such as a cache memory of a processor, the system memory, or other memory. The memory 604 may be an external storage device or database for storing data. Examples include a hard drive, compact disc ("CD"), digital video disc ("DVD"), memory card, memory stick, floppy disc, universal serial bus ("USB") memory device, or any other device operative to store data. The memory 604 is operable to store instructions executable by the processor 602. The functions, acts or tasks illustrated in the figures or described herein may be performed by the processor 602 executing the instructions stored in the memory 604. The functions, acts or tasks are independent of the particular type of instructions set, storage media, processor or processing strategy and may be performed by software, hardware, integrated circuits, firm-ware, micro-code and the like, operating alone or in combination. Likewise, processing strategies may include multiprocessing, multitasking, parallel processing and the like.

As shown, the computer system 600 may further include a display 610, such as a liquid crystal display (LCD), an organic light emitting diode (OLED), a flat panel display, a solid-state display, a cathode ray tube (CRT), a projector, a printer or other now known or later developed display device for outputting determined information. The display 610 may act as an interface for the user to see the functioning of the processor 602, or specifically as an interface with the software stored in the memory 604 or in the drive unit 606.

Additionally or alternatively, the computer system 600 may include an input/output device 612 configured to allow a user to interact with any of the components of computer system 600. The input/output device 612 may be a number pad, a keyboard, or a cursor control device, such as a mouse, or a joystick, touch screen display, remote control, or any other device operative to interact with the computer system 600.

The computer system 600 may also or alternatively include drive unit 606 implemented as a disk or optical drive. The drive unit 606 may include a computer-readable medium 622 in which one or more sets of instructions 624, e.g. software, can be embedded. Further, instructions 624 may embody one or more of the methods or logic as described herein. The instructions 624 may reside completely or partially within the memory 604 and/or within the processor 602 during execution by the computer system 600. The memory 604 and the processor 602 also may include computer-readable media as discussed above.

In some systems, a computer-readable medium 622 includes instructions 624 or receives and executes instructions 624 responsive to a propagated signal so that a device connected to a network 630 can communicate voice, video, audio, images, or any other data over the network 630. Further, the instructions 624 may be transmitted or received over the network 630 via a communication port or interface 620, and/or using a bus 608. The communication port or interface 620 may be a part of the processor 602 or may be a separate component. The communication port or interface 620 may be created in software or may be a physical connection in hardware. The communication port or interface 620 may be configured to connect with a network 630, external media, the display 610, or any other components in computer system 600, or combinations thereof. The connection with the network 630 may be a physical connection, such as a wired Ethernet connection or may be established wirelessly as discussed below. Likewise, the additional connections with other components of the computer system 600 may be physical connections or may be established wirelessly. The network 630 may alternatively be directly connected to a bus 608.

While the computer-readable medium 622 is shown to be a single medium, the term "computer-readable medium" may include a single medium or multiple media, such as a centralized or distributed database, and/or associated caches and servers that store one or more sets of instructions. The term "computer-readable medium" may also include any medium that is capable of storing, encoding, or carrying a set of instructions for execution by a processor or that cause a computer system to perform any one or more of the methods or operations disclosed herein. The computer-readable medium 622 may be non-transitory, and may be tangible.

The computer-readable medium 622 can include a solid-state memory such as a memory card or other package that houses one or more non-volatile read-only memories. The computer-readable medium 622 can be a random-access memory or other volatile re-writable memory. Additionally or alternatively, the computer-readable medium 622 can include a magneto-optical or optical medium, such as a disk or tapes or other storage device to capture carrier wave signals such as a signal communicated over a transmission medium. A digital file attachment to an e-mail or other self-contained information archive or set of archives may be considered a distribution medium that is a tangible storage medium. Accordingly, the disclosure is considered to include any one or more of a computer-readable medium or a distribution medium and other equivalents and successor media, in which data or instructions may be stored.

In an alternative implementation, dedicated hardware implementations, such as application specific integrated circuits, programmable logic arrays and other hardware devices, can be constructed to implement one or more of the methods described herein. Applications that may include the apparatus and systems of various implementations can broadly include a variety of electronic and computer systems. One or more implementations described herein may implement functions using two or more specific interconnected hardware modules or devices with related control and data signals that can be communicated between and through the modules, or as portions of an application-specific integrated circuit. Accordingly, the present system encompasses software, firmware, and hardware implementations.

The computer system 600 may be connected to a network 630. The network 630 may define one or more networks including wired or wireless networks. The wireless network may be a cellular telephone network, an 802.11, 802.16, 802.20, or WiMAX network. Further, such networks may include a public network, such as the Internet, a private network, such as an intranet, or combinations thereof, and may utilize a variety of networking protocols now available or later developed including, but not limited to TCP/IP based networking protocols. The network 630 may include wide area networks (WAN), such as the Internet, local area networks (LAN), campus area networks, metropolitan area networks, a direct connection such as through a Universal Serial Bus (USB) port, or any other networks that may allow for data communication. The network 630 may be configured to couple one computing device to another computing device to enable communication of data between the devices. The network 630 may generally be enabled to employ any form of machine-readable media for communicating information from one device to another. The network 630 may include communication methods by which information may travel between computing devices. The network 630 may be divided into sub-networks. The sub-networks may allow access to all of the other components connected thereto or the sub-networks may restrict access between the components. The network 630 may be regarded as a public or private network connection and may include, for example, a virtual private network or an encryption or other security mechanism employed over the public Internet, or the like.

In accordance with various implementations of the present disclosure, the methods described herein may be implemented by software programs executable by a computer system. Further, in an exemplary, non-limited implementation, implementations can include distributed processing, component/object distributed processing, and parallel processing. Alternatively, virtual computer system processing can be constructed to implement one or more of the methods or functionality as described herein.

Although the present specification describes components and functions that may be implemented in particular implementations with reference to particular standards and protocols, the disclosure is not limited to such standards and protocols. For example, standards for Internet and other packet switched network transmission (e.g., TCP/IP, UDP/IP, HTML, HTTP) represent examples of the state of the art. Such standards are periodically superseded by faster or more efficient equivalents having essentially the same functions. Accordingly, replacement standards and protocols having the same or similar functions as those disclosed herein are considered equivalents thereof.

It will be understood that the steps of methods discussed are performed in one embodiment by an appropriate processor (or processors) of a processing (i.e., computer) system executing instructions (computer-readable code) stored in storage. It will also be understood that the disclosure is not limited to any particular implementation or programming technique and that the disclosure may be implemented using any appropriate techniques for implementing the functionality described herein. The disclosure is not limited to any particular programming language or operating system.

It should be appreciated that in the above description of exemplary embodiments of the invention, various features of the invention are sometimes grouped together in a single embodiment, figure, or description thereof for the purpose of streamlining the disclosure and aiding in the understanding of one or more of the various inventive aspects. This method of disclosure, however, is not to be interpreted as reflecting an intention that the claimed invention requires more features than are expressly recited in each claim. Rather, as the following claims reflect, inventive aspects lie in less than all features of a single foregoing disclosed embodiment. Thus, the claims following the Detailed Description are hereby expressly incorporated into this Detailed Description, with each claim standing on its own as a separate embodiment of this invention.

Furthermore, while some embodiments described herein include some but not other features included in other embodiments, combinations of features of different embodiments are meant to be within the scope of the invention, and form different embodiments, as would be understood by those skilled in the art. For example, in the following claims, any of the claimed embodiments can be used in any combination.

Furthermore, some of the embodiments are described herein as a method or combination of elements of a method that can be implemented by a processor of a computer system or by other means of carrying out the function. Thus, a processor with the necessary instructions for carrying out such a method or element of a method forms a means for carrying out the method or element of a method. Furthermore, an element described herein of an apparatus embodiment is an example of a means for carrying out the function performed by the element for the purpose of carrying out the invention.

In the description provided herein, numerous specific details are set forth. However, it is understood that embodiments of the invention may be practiced without these specific details. In other instances, well-known methods, structures and techniques have not been shown in detail in order not to obscure an understanding of this description.

Thus, while there has been described what are believed to be the preferred embodiments of the invention, those skilled in the art will recognize that other and further modifications may be made thereto without departing from the spirit of the invention, and it is intended to claim all such changes and modifications as falling within the scope of the invention. For example, any formulas given above are merely representative of procedures that may be used. Functionality may be added or deleted from the block diagrams and operations may be interchanged among functional blocks. Steps may be added or deleted to methods described within the scope of the present invention.

The above disclosed subject matter is to be considered illustrative, and not restrictive, and the appended claims are intended to cover all such modifications, enhancements, and other implementations, which fall within the true spirit and scope of the present disclosure. Thus, to the maximum extent allowed by law, the scope of the present disclosure is to be determined by the broadest permissible interpretation of the following claims and their equivalents, and shall not be restricted or limited by the foregoing detailed description. While various implementations of the disclosure have been described, it will be apparent to those of ordinary skill in the art that many more implementations and implementations are possible within the scope of the disclosure. Accordingly, the disclosure is not to be restricted except in light of the attached claims and their equivalents.

What is claimed is:

1. A computer-implemented method for processing one or more forms to automatically adjudicate religious exemptions for one or more users, the computer-implemented method comprising:
   receiving, at one or more processors via one or more user interfaces of a user device, an input for a user to one or more data fields of the one or more forms associated with a religious exemption request, wherein the input is in a first data format and includes one or more of: location information, religious information, employment information, or demographic information associated with the user;
   determining, by the one or more processors, one or more exemption- relevant features from the input;
   generating, by the one or more processors, a data object including the one or more exemption-relevant features;
   transforming, by the one or more processors and using a language model, the one or more exemption-relevant features into corresponding one or more embeddings in a second data format, wherein the one or more embeddings represent semantic relations between the one or more exemption-relevant features;
   determining, by the one or more processors and using a classification model, authenticity of the data object based on the one or more embeddings, wherein the classification model has been trained using a plurality of embeddings representative of a plurality of exemption-relevant features; and
   transmitting, by the one or more processors, a first notification to the one or more user interfaces, the first notification indicating an approval or a disapproval of the religious exemption request.

2. The computer-implemented method of claim 1, wherein generating the data object further comprises:
   extracting, by the one or more processors and using an extraction module, the one or more exemption-relevant features from the one or more data fields of the one or more forms.

3. The computer-implemented method of claim 1, wherein determining the authenticity of the data object comprises:
   classifying, by the one or more processors and using the classification model, the data object based on the one or more embeddings in the second data format;
   generating, by the one or more processors, a natural language processing score based on the semantic relations between the one or more embeddings in the second data format; and
   comparing, by the one or more processors, the natural language processing score to a decision threshold to determine the authenticity of the data object.

4. The computer-implemented method of claim 3, further comprising:
   recalibrating the natural language processing score based, at least in part, on updated laws or regulations related to the religious exemptions.

5. The computer-implemented method of claim 1, further comprising:
   collecting and storing the one or more forms in a database, wherein the one or more forms are in multiple formats;
   categorizing each form of the one or more forms based, at least in part, on an entity associated with the form, wherein the entity is one of a private service provider, a state, or a federal government;
   monitoring, in real-time or near real-time, changes in entity-imposed laws or regulations pertaining to the one or more forms; and
   updating, in real-time or near real-time, the one or more forms based on the monitoring.

6. The computer-implemented method of claim 1, further comprising:
   monitoring, in real-time or near real-time, the input for the user to determine completion of the one or more data fields of the one or more forms; and
   transmitting a second notification to the one or more user interfaces, the second notification indicating one or more incomplete data fields of the one or more forms.

7. The computer-implemented method of claim 1, wherein the language model applies a statistical model, a neural network-based model, a transformer models, or a combination thereof to transform the one or more exemption-relevant features in the first data format into the one or more embeddings in the second data format.

8. The computer-implemented method of claim 7, wherein the statistical model factorizes a feature co-occurrence matrix built from a dataset of the one or more forms, and the neural network-based model predicts a pair of features co-occurring together within a time threshold of each other.

9. The computer-implemented method of claim 7, wherein the statistical model includes Global Vectors for Word Representation (GloVe).

10. The computer-implemented method of claim 7, wherein the neural network-based model includes a word2vec algorithm.

11. The computer-implemented method of claim 7, wherein the transformer model includes Bidirectional Encoder Representations from Transformers (BERT).

12. The computer-implemented method of claim 1, wherein the disapproval of the religious exemption request is automatically queued in a review database based, at least in part, on, temporal information, contextual information, or a combination thereof for additional review.

13. The computer-implemented method of claim 1, wherein the one or more embeddings in the second data format comprise a plurality of embeddings, and each embedding of the plurality of embeddings in the second data format is a numerical representation that projects the corresponding exemption-relevant feature in a geometric hyperspace based, at least in part, on a semantic similarity to- between the embeddings in the second data format.

14. The computer-implemented method of claim 1, wherein the one or more user interfaces include a touch interface, a video interface, an audio interface, another sensory interface, or a combination thereof.

15. A system for processing one or more forms to automatically adjudicate religious exemptions for one or more users, the system comprising:
one or more processors; and
at least one non-transitory computer readable medium storing instructions that, when executed by the one or more processors, cause the one or more processors to perform operations comprising:
receiving, via one or more user interfaces of a user device, an input for a user to one or more data fields of the one or more forms associated with a religious exemption request, wherein the input is in a first data format and includes one or more of: location information, religious information, employment information, or demographic information associated with the user;
determining one or more exemption-relevant features from the input;
generating a data object including the one or more exemption-relevant features;
transforming, using a language model, the one or more exemption-relevant features into corresponding one or more embeddings in a second data format, wherein the one or more embeddings represent semantic relations between the one or more exemption-relevant features;
determining, using a classification model, authenticity of the data object based on the one or more embeddings, wherein the classification model has been trained using a plurality of embeddings representative of a plurality of exemption-relevant features; and
transmitting a first notification to the one or more user interfaces, the first notification indicating an approval or a disapproval of the religious exemption request.

16. The system of claim 15, wherein generating the data object further comprises:
extracting, using an extraction module, the one or more exemption-relevant features from the one or more data fields of the one or more forms.

17. The system of claim 15, wherein determining the authenticity of the data object, further comprises:
classifying, using the classification model, the data object based on the one or more embeddings in the second data format;
generating a natural language processing score based on the semantic relations between the one or more embeddings in the second data format; and
comparing the natural language processing score to a decision threshold to determine the authenticity of the data object.

18. The system of claim 17, further comprising:
recalibrating the natural language processing score based, at least in part, on updated laws or regulations related to the religious exemptions.

19. The system of claim 15, further comprising:
collecting and storing the one or more forms in a database, wherein the one or more forms are in multiple formats;
categorizing each form of the one or more forms based, at least in part, on an entity associated with the form, wherein the entity is one of a private service provider, a state, or a federal government;
monitoring, in real-time or near real-time, changes in entity-imposed laws or regulations pertaining to the one or more forms; and
updating, in real-time or near real-time, the one or more forms based on the monitoring.

20. At least one non-transitory computer readable medium for processing one or more forms to automatically adjudicate religious exemptions for one or more users, the at least one non-transitory computer readable medium storing instructions that, when executed by one or more processors, cause the one or more processors to perform operations comprising:
receiving, via one or more user interfaces of a user device, an input for a user to one or more data fields of the one or more forms associated with a religious exemption request, wherein the input is in a first data format and includes one or more of: location information, religious information, employment information, or demographic information associated with the user;
determining one or more exemption-relevant features from the input;
generating a data object including the one or more exemption-relevant features;
transforming, using a language model, the one or more exemption-relevant features into corresponding one or more embeddings in a second data format, wherein the one or more embeddings represent semantic relations between the one or more exemption-relevant features;
determining, using a classification model, authenticity of the data object based on the one or more embeddings, wherein the classification model has been trained using a plurality of embeddings representative of a plurality of exemption-relevant features; and transmitting a first notification to the one or more user interfaces, the first notification indicating an approval or a disapproval of the religious exemption request.

* * * * *

UNITED STATES PATENT AND TRADEMARK OFFICE
CERTIFICATE OF CORRECTION

| | |
|---|---|
| PATENT NO. | : 12,254,275 B1 |
| APPLICATION NO. | : 18/048598 |
| DATED | : March 18, 2025 |
| INVENTOR(S) | : Ahmed Selim, Rama Ravindranathan and Mostafa Bayomi |

Page 1 of 1

It is certified that error appears in the above-identified patent and that said Letters Patent is hereby corrected as shown below:

In the Claims

In Column 21, Line 65, delete "exemption- relevant" and insert --exemption-relevant--; and In Column 23, Line 28, after "similarity" delete "to-".

Signed and Sealed this
Twenty-fourth Day of June, 2025

Coke Morgan Stewart
*Acting Director of the United States Patent and Trademark Office*